Jan. 4, 1955 V. J. COOPER 2,698,898

AMPLIFIER CIRCUIT ARRANGEMENT

Filed March 14, 1949

INVENTOR.
Victor James Cooper,
BY
Baldwin, Wight, & Prevost
ATTORNEYS

United States Patent Office 2,698,898

Patented Jan. 4, 1955

2,698,898

AMPLIFIER CIRCUIT ARRANGEMENT

Victor James Cooper, Writtle, England, assignor to Marconi's Wireless Telegraph Company Limited, London, England, a company of Great Britain Application March 14, 1949, Serial No. 81,310

Claims priority, application Great Britain March 25, 1948

4 Claims. (Cl. 250—27)

This invention relates to amplifier circuit arrangements and has for its object to provide improved and very simple amplifier circuit arrangements whereby a varying amplitude signal wave may be amplified as respects signals lying within a predetermined portion of its whole range of amplitude variation without affecting signals of an amplitude outside said portion.

According to this invention an amplifier circuit arrangement comprises a cathode input amplifier which is connected as a series boosting amplifier across an impedance in a varying amplitude signal wave channel and is biassed to be responsive only to input amplitudes on one side of an intermediate amplitude between the extreme limits of variation of said signal wave whereby a series boost amplification is effected as respects that portion of the signal wave on said one side without affecting the other portion of the signal wave.

The invention is particularly suitable for and primarily intended for television signal waves of the kind in which picture signals and synchronizing signals occupy different portions of the full range of amplitude variation of a composite signal wave. As is well known the numerous television systems in which synchronizing signals are in the "blacker than black" direction employ such waves.

Preferably the input amplitude at which the cathode input series boosting amplifier becomes responsive is adjustable, and the amplifier is biassed to be non-conductive to inputs above this amplitude.

Figure 1:
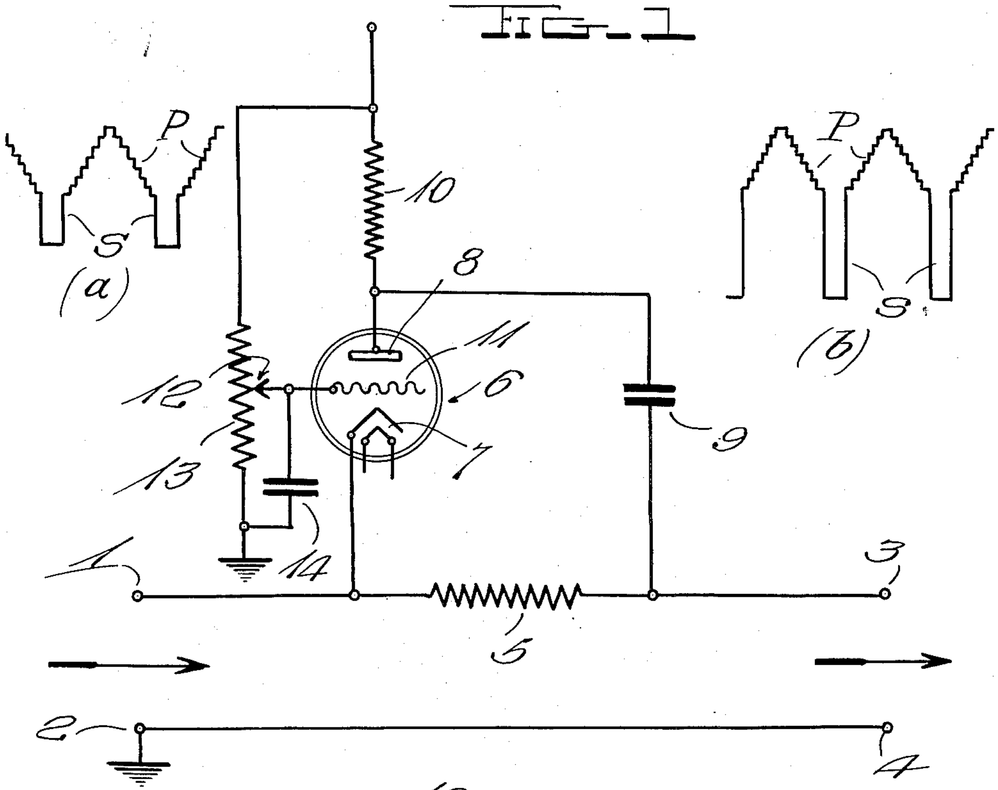
Figure 2:
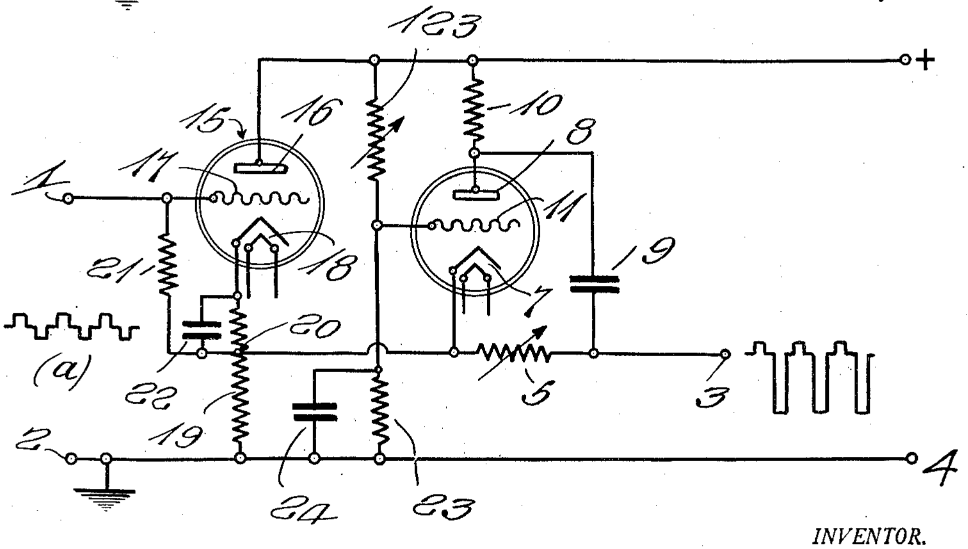

The invention is illustrated in the accompanying drawings which show, in simplified circuit diagram form, two embodiments thereof, in which:

Figure 1 is a circuit diagram showing an amplifier system embodying the principles of the invention; and Fig. 2 is a circuit diagram of a modified form of amplifier system of the invention.

Referring to Fig. 1 a composite signal wave such as that represented at *a* and consisting of picture signals P and synchronizing signals S which are in the "blacker than black" direction are applied between the input terminals 1, 2 of an arrangement in accordance with this invention and taken off from the output terminals 3, 4 thereof, one input terminal 2 being earthed and common with one output terminal 4 and the other input terminal 1 (the live input terminal) being connected to the remaining output terminal 3 (the live output terminal) through a suitable resistance 5. A series boosting amplifier comprising any suitable form of valve—a triode 6 is shown—has its cathode 7 connected to the live input terminal 1. The anode 8 of the valve 6 is connected to the live output terminal 3 through a condenser 9 and receives anode potential through a suitable resistance 10 from the positive terminal of a high tension supply source. The grid 11 of the valve is connected to an adjustable tap 12 on a potentiometer resistance 13 one end of which is taken to the positive terminal of the high tension source and the other end of which is at a lower D. C. potential than the cathode of the valve. As shown the said other end is earthed. A suitable by-pass condenser 14 is connected between the adjustable tap 12 and earth.

As will be seen the bias on the grid 11 will depend on the setting of the tap 12 and in practice this is adjusted so that the valve is non-conductive over the range of input amplitudes corresponding to the picture signals P but is conductive and therefore acts as a series boost amplifier over the adjacent range of input amplitudes corresponding to the synchronizing signals S. With this arrangement therefore the synchronizing signals will be amplified but the picture signals will not.

Adjustment of the magnitude of boost can be obtained by control of the point at which boost commences, i. e. by control of the bias setting determined by the potentiometer adjustable tap 12 and/or by adjustment of the gain of the valve which may be affected by control of the resistance 10 in the anode circuit thereof and/or by control of the resistance 5 between the terminals 1 and 3. Either or both of these resistances may be made adjustable. Other methods of control are, of course, possible, depending upon the type of valve employed. At *b* in Fig. 1 is shown an output wave corresponding to the input wave at *a* the signals P being practically unchanged but the signals S being amplified. In order not to complicate Fig. 1 the complete circuit for applying anode potential to the valve 6 and providing a D. C. plate-to-cathode path for this valve is not shown. Such a D. C. plate-to-cathode path is, of course, provided in any of the ways well known to those skilled in the art; for example, where the load connected to the terminals 3, 4, is a path permeable to direct current the said direct current path may be completed through this load but any other well known means for completing the said path may be used.

In response to an input signal such as that shown at A in Fig. 1, and depending upon the bias applied to grid 11 of valve 6, the said valve 6 will become conductive when the signal amplitude drops towards black from a given value because, the bias on the grid being fixed, the potential on cathode 7 will be brought so low as to overcome the bias. On the contrary when the signal goes in the picture direction towards white, the potential on the cathode will rise and the valve will not become conductive. In the former case the potential of the anode of valve 6 drops to a low value due to the current flowing in resistance 10. In the latter case since there is no drop of potential in resistance 10 the anode potential does not vary.

The invention is not limited to the arrangement above described and a modification will now be described with reference to Fig. 2 with numerical examples of included circuit elements. It is to be understood that these numerical examples are in no way limiting but are given merely as typical practical values.

In this embodiment a first valve 15 which may be of any convenient form but is for the sake of simplicity shown as a triode, has its anode 16 connected to HT+, its grid 17 connected to the live input terminal 1, its cathode 18 being connected through a suitable resistance 19 to the earthed input and output terminals 2, 4. The live output terminal 3 is connected to an intermediate point 20 on resistance 19 through an adjustable resistance 5 having a maximum value of say 5000 ohms. The grid 17 is also connected to this point through a suitable resistance 21 and a condenser 22 is provided between said point and the cathode 18. The cathode 7 of a valve 6 which is also shown as a triode, is connected to the point 20 and its anode 8 is connected to HT+ through a resistance 10 of say 10,000 ohms. The anode 8 is also connected to the live output terminal 3 through a condenser 9 of say 0.1 micro-farad. The grid 11 of valve 6 is connected to HT+ through a variable resistance 123 having a maximum value of say 500,000 ohms and is also connected to the earthed input and output terminals 2, 4 through a resistance 23 of about 4700 ohms shunted by a capacity 24 of about 0.1 micro-farad.

A circuit arrangement as illustrated in Fig. 2 and with the dimensions stated was tried experimentally for boosting the negative going portion of a rectangular wave as represented at *a* in Fig. 2 and having alternate positive and negative portions and increasing the negative portions by about three times, leaving the positive going portions unaffected and giving an output wave as represented at *b* in Fig. 2.

I claim:

1. An amplifier circuit arrangement for amplifying only a predetermined portion of a signal wave, said predetermined portion being of amplitudes lying on one side only of a predetermined intermediate amplitude between the extreme limits of amplitude of said signal wave, said arrangement comprising a pair of input terminals, a pair of output terminals, a resistive impedance winding, a connection connecting one end of said impedance winding to one of said input terminals, a connection connecting the other end of said impedance winding to one of said output terminals, a connection between the other of said input terminals and the other of said output terminals, means for maintaining said connection at a reference potential, and a cathode-input booster amplifier with its cathode input connected to be fed from said one input terminal said amplifier grid-biased to cut-off at a predetermined amplitude intermediate said extreme limits and having its output connected to feed only said predetermined portion of said signal wave into said one output terminal through an alternating current coupling connection impermeable to direct current.

2. An amplifier circuit arrangement for amplifying only a predetermined portion of a varying amplitude signal wave as set forth in claim 1 which includes adjustable grid-bias means for said amplifier.

3. An amplifier circuit arrangement for amplifying only a predetermined portion of a signal wave, said predetermined portion being of amplitude lying on one side only of a predetermined intermediate amplitude between the extreme limits of amplitude of said signal wave, said arrangement comprising a pair of input terminals, a pair of output terminals, a resistive impedance winding, a connection connecting one end of said impedance winding to one of said input terminals, a connection connecting the other end of said impedance winding to one of said output terminals, a connection between the other of said input terminals and the other of said output terminals, means for maintaining said connection at a reference potential, a cathode-input booster amplifier valve biased to cut-off at a predetermined amplitude intermediate said extreme limits and responsive only to amplitudes lying on one side of said predetermined intermediate amplitude and having its cathode connected to said one input terminal and its anode coupled to said one output terminal through a capacitance.

4. An amplifier circuit arrangement for amplifying only a predetermined portion of a varying amplitude signal wave, said predetermined portion being of amplitudes lying on one side only of a predetermined intermediate amplitude between the extreme limits of amplitude of said signal wave, said arrangement comprising a pair of input terminals, a pair of output terminals, a connection including a series impedance between one of said input terminals and one of said output terminals, a connection between the other of said input terminals and the other of said output terminals, means for maintaining said connection at a reference potential, a cathode input amplifier valve having its anode coupled to said one output terminal through a capacitance and its cathode connected to the end of said series impedance remote from said one output terminal, an additional amplifier, means for applying signals at said input terminals between the grid of said additional amplifier and the far end of a resistance in the cathode circuit of said additional amplifier, a connection between an intermediate point on said last mentioned resistance and the cathode of said cathode input amplifier valve, and bias means biasing said cathode input amplifier valve to be responsive only to amplitudes lying on said one side of said predetermined intermediate amplitude.

References Cited in the file of this patent

UNITED STATES PATENTS

| | | |
|---|---|---|
| 2,207,587 | Kaar | July 9, 1940 |
| 2,226,255 | Percival | Dec. 24, 1940 |
| 2,241,595 | Gwanella | May 13, 1941 |
| 2,246,331 | White et al. | June 17, 1941 |
| 2,256,085 | Goodale | Sept. 16, 1941 |
| 2,266,531 | Bedford | Dec. 16, 1941 |
| 2,428,039 | Royden | Sept. 30, 1947 |
| 2,481,045 | Schroeder | Sept. 6, 1949 |
| 2,552,588 | Reeves | May 15, 1951 |
| 2,559,587 | Black | July 10, 1951 |